July 29, 1947.  W. W. HECKERT  2,424,751
PROCESS FOR PUMPING
Filed March 21, 1942  4 Sheets-Sheet 1
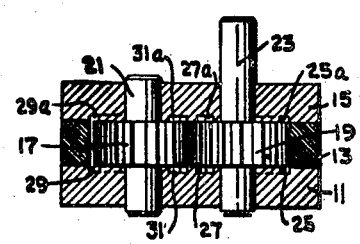
Fig. 1
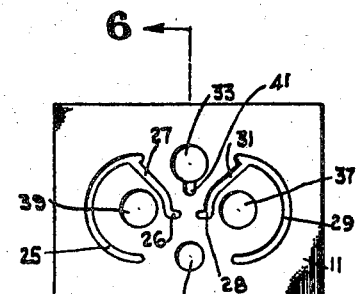
Fig. 2
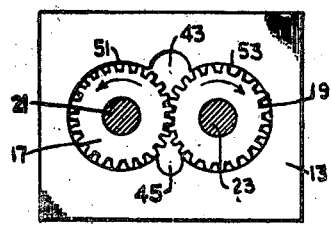
Fig. 3
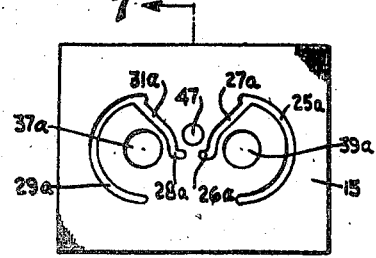
Fig. 4
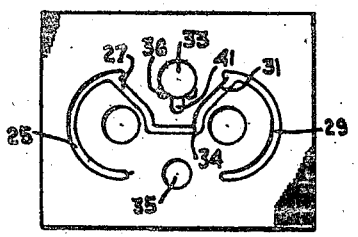
Fig. 8
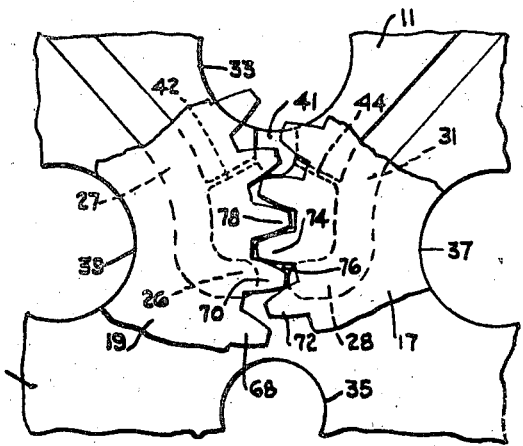
Fig. 5
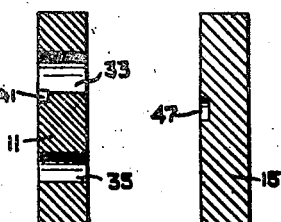
Fig. 6  Fig. 7
Winfield W. Heckert INVENTOR
BY 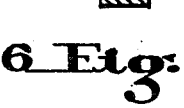

Winfield W. Heckert INVENTOR

July 29, 1947.  W. W. HECKERT  2,424,751
PROCESS FOR PUMPING
Filed March 21, 1942   4 Sheets-Sheet 4

Winfield W. Heckert INVENTOR

BY

Patented July 29, 1947

2,424,751

UNITED STATES PATENT OFFICE 2,424,751

PROCESS FOR PUMPING

Winfield Walter Heckert, Wilmington, Del., assignor to E. I. du Pont de Nemours & Company, Wilmington, Del., a corporation of Delaware Application March 21, 1942, Serial No. 435,670

7 Claims. (Cl. 261—1)

This invention relates to an improved method for metering bubble-free liquid taken from a supply of said liquid containing bubbles. More particularly, it relates to an improved method and apparatus for dissolving and displacing the bubbles of a bubble-containing liquid with a quantity of like liquid free from bubbles and metering the resultant bubble-free liquid. This invention has particular utility in metering a molten filament-forming composition which is subject to continuous decomposition with formation of gaseous decomposition products, for example, a synthetic linear polymer of the type disclosed in Carothers U. S. Patent No. 2,071,250.

This is a continuation-in-part application of my copending application Serial No. 345,119, filed July 12, 1940.

Throughout the present specification and claims the term "metering" is used to designate the forwarding of a liquid at a substantially constant rate.

Liquid filament-forming compositions, free from bubbles, are commonly metered by means of a precision pump, such as a gear pump, to a filament-forming spinneret. No difficulty is experienced by such an operation, with the commonly used precision gear pumps, when the liquid contains substantially no bubbles. Great difficulty, however, has been experienced in metering such liquids containing bubbles. In order to produce suitable filaments, the bubbles must be dissolved in the filament-forming liquid by pressure placed thereon. Since, however, the bubbles are always non-uniformly distributed in a bubble-containing liquid, the commonly used precision gear pump, which merely compresses the bubbles from the liquid and forwards the resultant liquid, will necessarily forward the resultant bubble-free liquid at a variable, inconstant rate depending upon the variation in bubble content of successive portions of the liquid being placed under pressure and forwarded. Clearly, therefore, under such circumstances the commonly used precision gear pump is incapable of metering the bubble-free liquid.

In the copending application of George DeWitt Graves, Serial No. 232,314, filed September 29, 1938, now Patent 2,278,875, dated April 7, 1942, there is disclosed a method of producing continuous structures, such as filaments, yarns, ribbons, and the like of very uniform denier or gauge, from compositions subject to bubble formation, by a process wherein the film- or filament-forming composition is subjected to sufficient pressure to dissolve the bubbles in the composition and then this bubble-free melt is metered, while being maintained under pressure, to an extrusion device such as a spinneret. This can be accomplished, for example, by the use of two pumps connected in series, the first subjecting the film- or filament-forming composition to pressure and delivering the bubble-free composition so produced to a second pump, which meters the bubble-free composition to a suitable extrusion device.

It is an object of the present invention to provide an improved method and apparatus for dissolving the bubbles in a bubble-containing liquid and metering, i. e., forwarding at a substantially constant rate, the resultant bubble-free liquid.

Other objects of the invention will appear hereinafter.

The objects of the invention may be accomplished, in general, by continuously forwarding, at a constant rate, a liquid containing bubbles, continuously forcing, at a constant rate, into said bubble-containing liquid, as it is being forwarded, a liquid of like composition but free from bubbles, the volume of said bubble-free liquid being at least equal to the volume of the bubbles in said bubble-containing liquid, and continuing the forwarding of the liquid, at a constant rate, in its bubble-free state.

The invention will be more easily understood by reference to the following detailed description when taken in connection with the accompanying drawings in which are shown several embodiments and arrangements of apparatus suitable for carrying out the objects and purposes of the invention.

In the drawings:

Figure 1 is a cross-section on the plane of the axes of the gears of a gear pump constructed in accordance with the invention.

Figure 2 is an elevational view of the inside face of one side plate of the gear pump shown in Figure 1.

Figure 3 is an elevational view of the center plate and gears of the pump shown in Figure 1.

Figure 4 is an elevational view of the inside face of the other side plate of the pump shown in Figure 1.

Figure 5 is an enlarged diagrammatic elevational view of a section of the gears projected on a section of the side plate shown in Figure 2.

Figure 6 is a cross-sectional view taken along the line 6—6 of Figure 2.

Figure 7 is a cross-sectional view taken along the line 7—7 of Figure 4.

Figure 8 is an elevational view of the inside face of a modified form of side plate.

Figure 9:
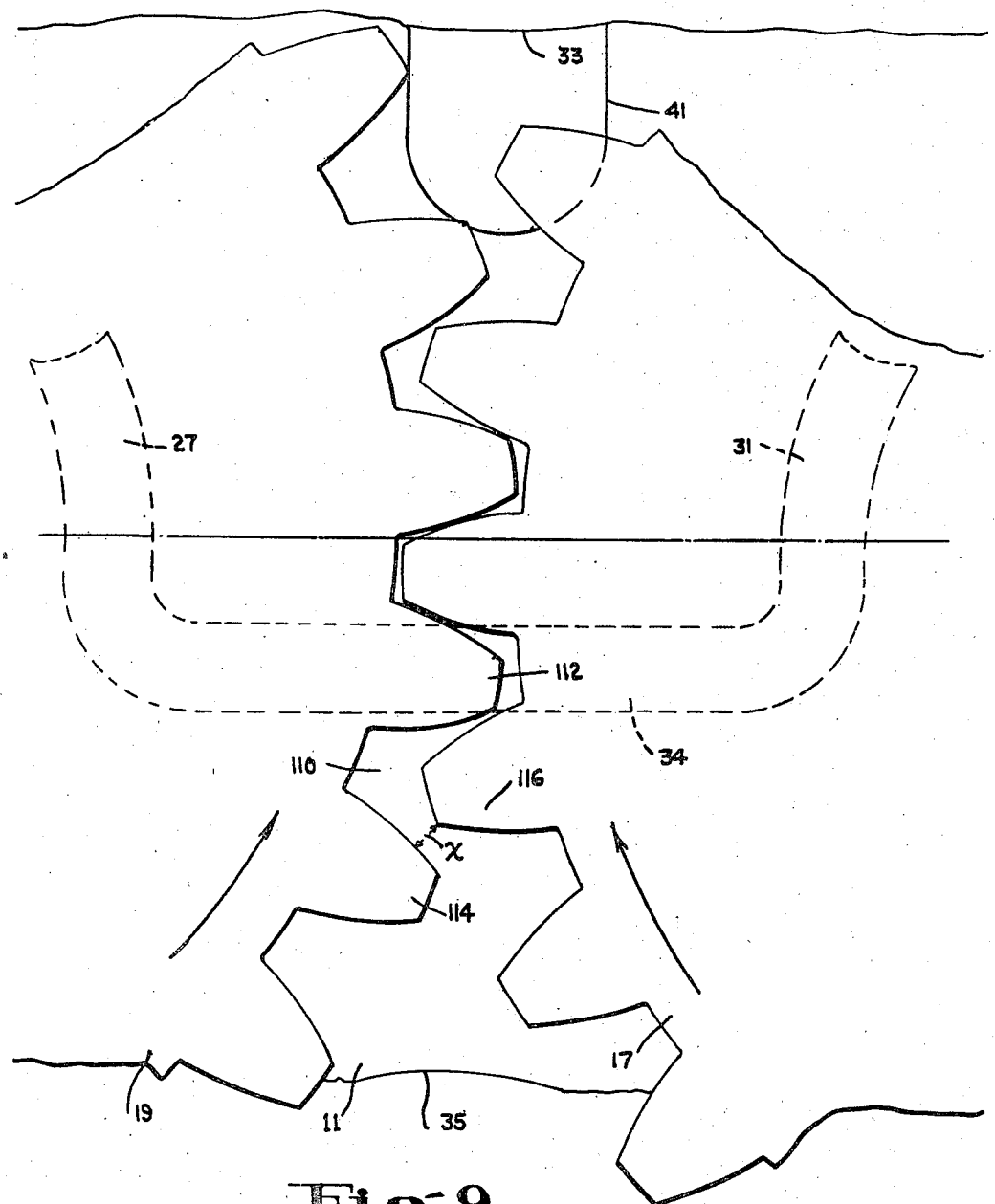
Figure 9 is a greatly enlarged diagrammatic elevational view illustrating the critical spacing between meshing gear teeth and the possible occasional connecting opening between the pressure passage with the outlet opening of the pump.

Referring to Figures 1 to 7 of the drawings, reference numeral 11 designates the rear side plate of the gear pump and numerals 13 and 15 designate respectively the center plate and front side plate. The three plates are held together by means of suitable bolts or screws (not shown). A pair of meshing gears 17 and 19 are operatively positioned within the center plate 13 and between side plates 11 and 15. The gears 17 and 19 are mounted respectively on drive shafts 21 and 23. The gear drive shafts 21 and 23 are journaled in the side plates 11 and 15, the shaft 21 being positioned in openings 37 and 37a of the respective rear and front plates, and shaft 23 being positioned in openings 39 and 39a respectively of said rear and front plates.

The rear side plate 11 is provided with an inlet opening 33 and an outlet opening 35 for the liquid. Plate 11 is furthermore provided with arcuate grooves 25 and 29, as well as connecting grooves 27 and 31, the latter grooves respectively connecting arcuate grooves 25 and 29 with depressions 26 and 28 which are positioned adjacent the points of intermeshing of the teeth of the gears 17 and 19 (see Figure 5). The several grooves are positioned on the inside face of the plate as is clearly shown in Figure 1. The arcuate grooves 25 and 29 are concentric with the shafts 21 and 23 and are positioned to overlie a number of gear teeth between the inlet 33 and the outlet 35. A small groove 41, connecting with the inlet opening 33, is also provided on the inside face of plate 11 (see Figures 2 and 6). The purpose of this groove 41 is to bring grooves 27 and 31 sufficiently close to inlet opening 33 to insure that leakage between the side plate 11 and the center plate, due to excess pressure on the liquid in grooves 27 and 31, will flow to the inlet opening 33 rather than the outlet opening 35. If desired, fine grooves 42 and 44 may be positioned between groove 41 and the grooves 27 and 31 to permit definite leakage from the latter grooves to the inlet opening. Such grooves as 42 and 44 must, however, be of considerably smaller capacity than the quantity of liquid entrapped between meshing gear teeth. The front side plate 15 is provided, on the inside face thereof with arcuate grooves 25a and 29a and connecting grooves 27a and 31a which are mirror images of the grooves in the rear side plate 11. Plate 15 is also provided with a small circular depression 47 which is positioned adjacent the point where the gears are unmeshing. Depression 47 functions to relieve any vacuum created by the unmeshing gears.

The center plate 13 contains two circular openings 51 and 53 into which the gears 17 and 19 fit with a minimum of clearance yet permitting free rotation of the gears. The gears 17 and 19 are shown mounted on their respective shafts 21 and 23. These are designed to be driven in the direction shown by the arrows. The enlarged recessed spaces 43 and 45 connect with the inlet 33 and outlet 35 respectively and serve as liquid conveying openings for the gears.

The mechanism whereby the filament-forming composition is entrapped between the gears, subjected to pressure, and fed into the grooves in the side plates is shown more clearly in Figure 5. The gears 17 and 19 at the point where the teeth engage and entrap the liquid overlie the depressions 26 and 28 at the ends of grooves 27 and 31. The tooth 70 of gear 19 has just reached a position relative to the teeth 72 and 74 of gear 17 where it has completely entrapped the filament-forming composition in the space 76 between the teeth 72 and 74 and is beginning to subject it to pressure. The depression 28 at the end of groove 31 in the rear side plate 11 is so located that the entrapped filament-forming composition is forced into the groove 31. A similar action occurs simultaneously at the corresponding depression 28a at the end of the groove 31a in the front side plate 15 (not shown). Simultaneously, the tooth 74, as shown, has just completed forcing the filament-forming composition, entrapped between teeth 76 and 78, into the depression 26 at the end of groove 27. The tooth 72 is shown entering the space between teeth 68 and 70 and will force the entrapped composition into depression 26 and groove 27, and, of course, the oppositely disposed depression 26a and groove 27a of front side plate, not shown in Figure 5. As will later appear, the spacing between approaching teeth 68 and 72 at the point where the interdental space between teeth 68 and 70 first opens to the depression 26 is critical to the successful operation of the pump. The composition forced into grooves 27 and 31, and 27a and 31a will be forced into the respective arcuate grooves 25 and 29, and 25a and 29a, and thence into the spaces between the gear teeth to which the arcuate grooves are contiguous. The additional pressure imparted to the composition being propelled from the inlet to the outlet opening will cause a dissolution of any bubbles which may be contained therein.

It is usually preferred to so design the gear teeth that a somewhat larger quantity of filament-forming composition is entrapped and fed through the grooves than is theoretically required, thus insuring that the teeth delivering the bubble-free, filament-forming composition are completely filled. This is especially desirable since the bubble content and the rate of bubble formation is inconstant and hence the bubble content of the filament-forming composition is non-uniform so that provision must be made to dissolve the maximum quantity of bubbles present at any time. For this reason, provision must be made for the release of the excess quantity of this material. In general, it is preferred that this be fed back to the inlet of the pump, especially if the quantity is non-uniform, since if fed to the outlet, it would defeat the purpose of uniform metering. This release can be accomplished in a number of ways. In some cases, the natural slip between the gear teeth and the center plate 13 will accomplish it or the clearance may be increased slightly to increase the slip. Likewise, slip between the faces of the gears and side plates 11 and 15 will permit return of the excess to the inlet. When this occurs, it is important to insure either by location of the inlet and outlet ports relative to the grooves and/or by supplementary grooves or recesses, that the resistance to slip between the grooves and the inlet port at their closest point is less than that between the grooves and the outlet port at their closest point. It will be noted that in Figure 2 the inlet port 33 is located closer to the grooves 27 and 31 than is the outlet port 35. The return of the excess to the inlet port may be further insured by an enlargement 41 of the inlet port as shown in Figure 2. This enlargement 41 need be only recessed in the plate 11; however, it may be recessed in both side plates 11 and 15.

The presence of this enlargement shortens the distance of closest approach of the connecting grooves 27 and 31 to the inlet port and thereby facilitates escape of excess composition to the inlet port across the face of the gears, between them and the plates 11 and/or 15. As above indicated, small passages, such as passages 42 and 44, may be recessed in the plate giving direct communication between the grooves carrying filament-forming composition to the teeth and the inlet port, the width and depth of the recessed passages being determined to maintain the desired pressure.

Although the length of the arcuate grooves 25 and 29 is shown to be approximately 180° in the drawings, many modifications of this length are possible in the scope of the invention. The criteria for selection of the proper length are: The concentration of bubbles present in the composition under the conditions of extrusion, the viscosity of the composition extruded and the precision of metering desired. As will be readily appreciated by one skilled in the art, one factor to be taken into account in determining the length of the grooves is the length of time the composition must be subjected to pressure to effect solution of the bubbles. A limit to the length of the grooves is imposed by the necessity of providing a sufficient distance between the end of a groove and the outlet port to prevent slip of the composition from the groove to the outlet. Such a slip would destroy the metering feature of the pump of this invention. Another limit to the length of the grooves is the necessity for provision of an ungrooved or only slightly grooved space between the inlet port and the grooves as has been indicated above in discussion of release of excess composition from the grooves. It is preferred that the arcuate grooves be sufficiently long to overlie at least four gear teeth.

Many modifications of the shape of the grooves are possible. For example, in Figure 8 the connecting grooves 27 and 31 are extended to join each other by the groove 34. Similarly, while the grooves have been shown in both the front and rear plates they may be placed in only one plate if desired. Obviously, other modified constructions for return of excess composition to the inlet opening can be devised. In Figure 8, recessions are shown at 36 in addition to that shown at 41 to facilitate this action.

As above indicated, the composition entrapped between gear teeth must be compressed with sufficient pressure and must be in sufficient volume to dissolve the bubbles and displace the bubble volume in the composition being forwarded between the inlet and outlet openings of the pump. Furthermore, in order that the pump meter at a constant rate, it is necessary that the amount of liquid caught by the meshing gear teeth from the outlet port be maintained substantially constant and of greater volume than that of the bubbles contained in the forwarded bubble-containing composition. It is, therefore, preferred that the connecting grooves 27 and 31 (or the groove 34 as shown in Figure 8) are never open to the outlet port, therefore, never permitting backflow from the grooves to the outlet port. Nevertheless, in practice, a slight occasional opening between the grooves and outlet port can be tolerated.

In Figure 9 is shown a permissible construction in which there will be a slight intermittent opening between the groove 34 and outlet opening 35. Referring specifically to the drawing, it will be noted that the interdental space 110, between teeth 112 and 114 has just opened to the groove 34. At this point in the rotation of the gears 19 and 17, the distance "x" between the tooth 116 which is passing into the interdental space 110 and the next succeeding tooth 114 should not exceed .02 inch. If the distance "x" is greater than .02 inch, the gear pump will be unable to meter the liquid due to excessive and non-uniform backflow of composition from the groove 34 to the outlet port. The above-said distance of .02 inch is, therefore, critical to the operativeness of the pump. The groove 34 is positioned on the outlet port side of the center line of the gears to prevent any possibility of the slightest opening between the groove 34 and the inlet port of the pump.

Figure 10:
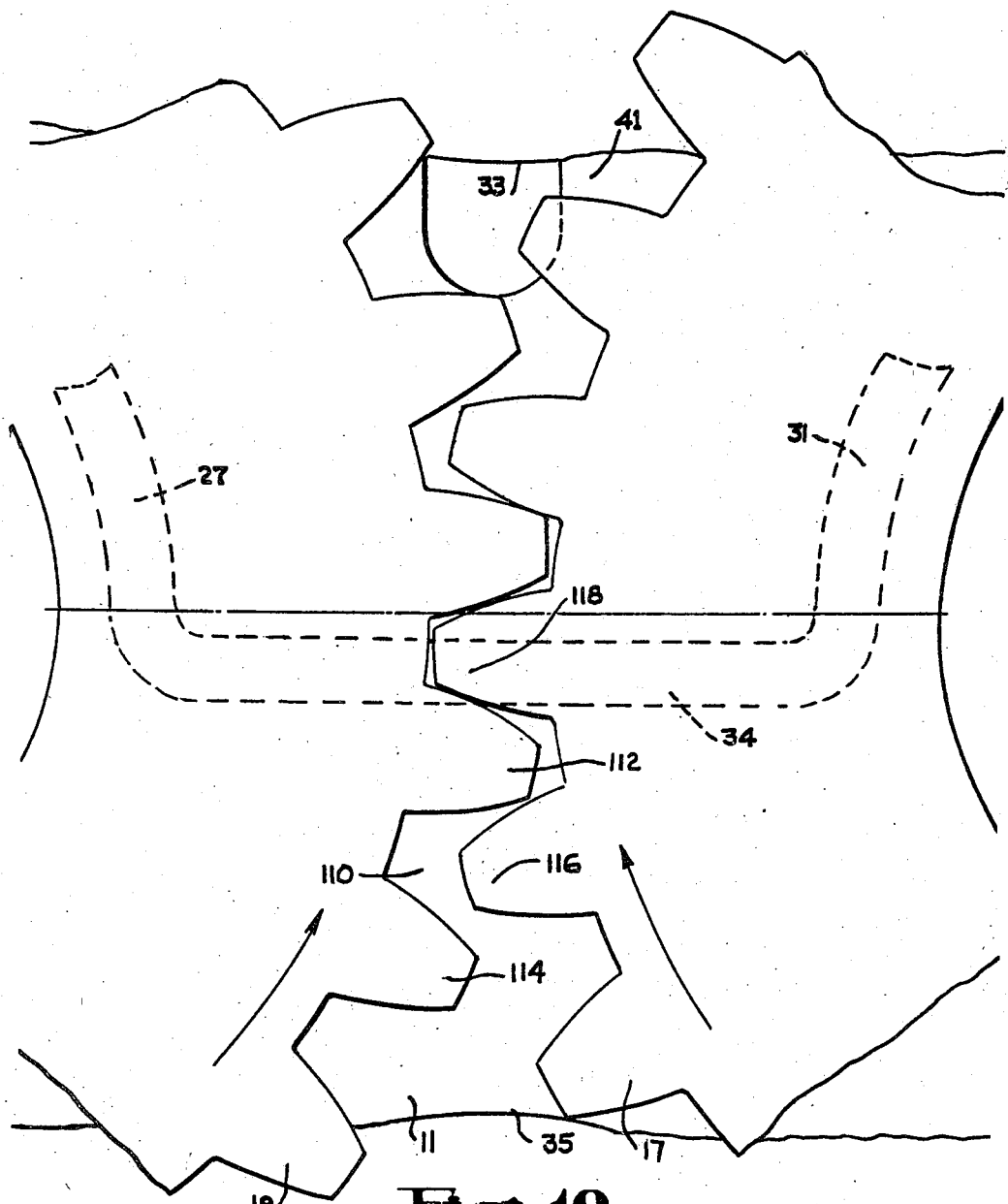
Figure 10 is a greatly enlarged diagrammatic elevational view showing a preferred construction in which the pressure passage is maintained closed to the outlet opening.

Figure 10 illustrates a preferred construction in which the groove 34 will be maintained closed to the outlet port 35, and, of course, to the inlet port 33. Referring to the drawing, it will be noted that the pressure groove 34 is of narrower width than in the modification shown in Figure 9; the groove 34 is also located nearer the center line of the gears 17 and 19. Tooth 112 of gear 19 is about to make contact with tooth 116 of gear 17 while opposing teeth 112 and 118 are still maintaining the groove 34 closed to the outlet port 35.

Figure 11:
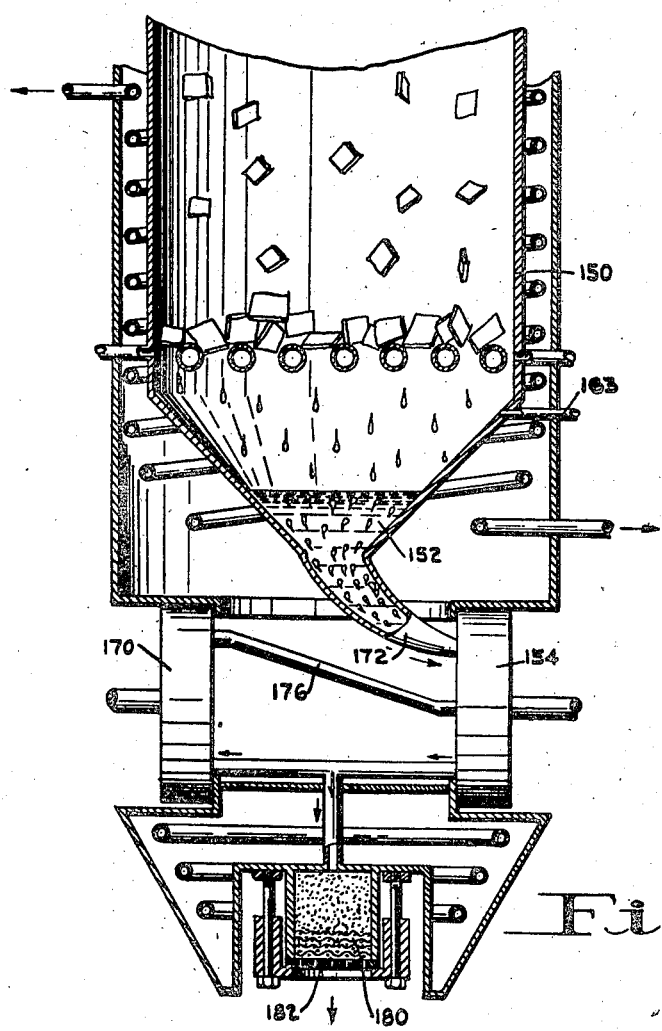
Figure 11 is a diagrammatic elevational view, with parts shown in section, of a modified form of apparatus suitable for use in carrying out the principles of the present invention.
Figure 12:
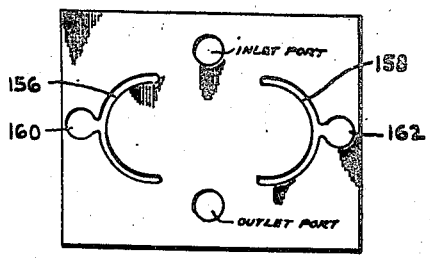
Figure 12 is a diagrammatic elevational view of a modified form of side plate for use in the apparatus shown in Figure 11.

Figures 11 and 12 show an entirely different modification of apparatus for practicing the objects of the invention, thus clearly showing that the process of the invention is not a mere function of the apparatus shown in Figures 1 to 10. Referring to Figures 11 and 12, reference numeral 150 designates a melting chamber for melting a filament-forming composition such as a synthetic linear polyamide. The molten composition, which contains bubbles is collected in hopper 152, from which it is led to the inlet port of a gear pump 154. Gear pump 154, except for a modified form of side plate, is constructed similar to the gear pump described with reference to Figures 1 to 10. At least one of the side plates of the pump 154 is constructed as shown in Figure 12. This side plate is provided with arcuate grooves 156 and 158 adjacent the teeth of the gears. The arcuate grooves 156 and 158, instead of being supplied by compressed composition entrapped by the meshing gear teeth, are supplied by a second pump 170 through side groove ports 160 and 162. A conduit 163 may, if desired, be connected to hopper 152 for passing nitrogen under pressure into the hopper to partially dissolve the bubbles in the composition. The conduit 172 connects the hopper 152 with the inlet port of pump 154. The composition passing from the outlet port of pump 154 is, in part, passed through the spinneret pack 180 to the filament-forming spinheret 152. A constant given fractional portion of the composition passing from the outlet port of pump 154 is passed to the inlet port of a second gear pump 170. The gear pump 170 is a conventional precision gear pump, such as is commonly used in the pumping of bubble-free composition. The delivery of pump 170 must be substantially constant but of much smaller amount than pump 154. The composition passing from the outlet port of pump 170 is passed, by means of conduit 176 to the side groove ports 160 and 162 of the side plate of pump 154. The delivery of pump 170 must be at least equal to, and is preferably slightly in excess of, the volume of the bubbles of the composition passing between the inlet and outlet ports of pump 154. The pump 170 will pump only bubble-free composition since the bubbles in the composition passing between the inlet and outlet ports of pump 154 will be dissolved and displaced by the composition passing into the side groove ports 160 and 162. The pump 154 will, therefore, meter, i. e., forward at a substantially constant rate, bubble-free composition to the spinneret. If desired, the bubbles can be partially dissolved in the composition before it is passed into pump 154. This may be accomplished by passing nitrogen under the desired pressure into the hopper 152 through conduit 163.

In accordance with the present invention, in order to dissolve the bubbles in a bubble-containing liquid and to forward the bubble-free liquid at a constant rate, it is essential that a bubble-free liquid which is forced into the forwarded bubble-containing liquid have a volume at least equal to the total volume of the bubbles contained in the forwarded bubble-containing liquid. Otherwise, the bubbles cannot be dissolved and displaced with bubble-free composition. The excess of the composition will, by slip, or by specific provision of leakage grooves, be passed to the inlet end of the pump. The permissible volume of bubbles in the composition depends upon the type of pumping apparatus used. In an apparatus of the type shown in Figures 1 to 10, the composition should not have an average bubble content substantially exceeding 4%, since the quantity of composition entrapped by the meshing teeth is limited to about that amount. In the apparatus shown in Figure 11, however, the bubble content of the bubble-containing composition may be of any value, limited only by the possibility of dissolving the bubbles in the composition by pressure, since in this apparatus the pump 170 may be made to deliver any volume necessary to dissolve and displace the bubbles.

Although the bubble-free liquid may be from any source, it is preferred that it be taken from the outlet of the pump within which the bubbles of the bubble-containing liquid are dissolved and displaced. Thus, any necessity for the provision of another separate source of bubble-free liquid is avoided. When the bubble-free liquid is taken from the outlet of the pump, in order that the pump shall be capable of metering, it is essential that it be taken from such source at a constant rate.

A pump constructed in accordance with Figure 9 of the drawings and containing the following construction specifications will entrap approximately 4% of the metered composition and forward the same to the arcuate pressure groove for dissolution and displacement of bubbles. This pump will, therefore, dissolve the bubbles and meter, at a constant rate, a bubble-containing liquid of slightly less than 4% bubble content:

Outside diameter of gears, 0.9895 inch
Thickness of gears, 0.3932 inch
Center to center of gears, 0.9280 inch
Number of teeth of gears, 26
Diametral pitch, 28 dedendum; 32 addendum
Number of teeth communicating with arcuate pressure groove, 15
Clearance between teeth and center plate, 0.00075 inch
Clearance between gears and side plates, 0.0004 inch.

An apparatus constructed in accordance with Figure 11 is easily capable of dissolving the bubbles and metering, at a constant rate, a bubble-containing liquid of 8% bubble content. This may be accomplished by driving pump 154 at 14 R. P. M. and the auxiliary pump 170 at 1.68 R. P. M., the dimensions and clearances of the pumps being approximately the same as that given above.

Although the above-described pumping process and apparatus is especially adapted for the melt spinning of synthetic linear polyamides, it is obviously applicable to the melt spinning of any organic filament-forming composition, which is subject to the formation of bubbles, for any reason, under the conditions just prior to and during the spinning thereof provided the gases redissolve under pressure and the decomposition is slow enough to permit metering before sufficient gases are formed to exceed the solubility under the conditions of temperature and pressure. As examples of such filament-forming compositions in which bubble-formation may be present, the following may be mentioned: Synthetic linear polyamides, that is, synthetic linear polymers containing —CONH— units in the linear chain; synthetic linear polymers such as polyesters, polyethers, polyacetals and mixed polyester-polyamides such as may be prepared by condensation reactions as described in U. S. Patent No. 2,071,250 may also present problems of bubble formation which can be remedied by the process of the present invention. Other types of synthetic polymers such as ethylene polymers, vinyl polymers, polystyrene and polyacrylic acid derivatives may also be spun with advantage, in accordance with the present invention.

The filament-forming material used in accordance with the present invention may contain modifying agents, e. g., luster-modifying agents, plasticizers, pigments and dyes, antioxidants, resins, etc. The present invention may also be used to advantage in extruding film- or filament-forming compositions in which the bubble formation is caused by the presence of a modifying agent.

Although this invention has been described with reference to the extrusion of film or filament-forming compositions, it is also applicable to the metering of bubble-free compositions in the spinning of bristles and the coating of wires, etc.

This invention may also be used to advantage in the spinning or extrusion of other types of filament-forming solutions, for example, cellulose xanthate or other cellulose derivative solutions, when gas bubbles present a problem. Also, these solutions may be metered advantageously by this pump if they contain bubbles caused by the presence of modifying agents or from any other cause.

The invention also finds application in the pumping of liquids at or near their boiling points so that liquid only is metered without the presence of gases. In this connection, the apparatus has utility as a dispensing device. This pump may also be used to meter liquids undergoing decomposition with the evolution of gases.

By the practice of this invention it is possible to produce structures of very uniform properties particularly yarns of very uniform denier from filament-forming compositions having a tendency to form bubbles during the extrusion thereof. This is accomplished by a simple inexpensive and compact apparatus, the maintenance of which is low and the power consumption small. The uses of this apparatus are particularly advantageous in the spinning of molten composition.

Gear pumps constructed according to this invention tend to show less wear in use than previously known gear pumps. This is due to the equalization of pressures of the liquid being metered over a large segment of the gear teeth and to the fact that in this pump pressure of the composition on both sides of the gear arbors is balanced.

Obviously, many changes and modifications can be made in the above-described structures without departing from the nature and spirit of the present invention. It is, therefore, to be understood that the invention is not to be limited to the specific structures above-described except as set forth in the following claims.

I claim:

1. The process of dissolving the bubbles in a bubble-containing liquid and metering said liquid in its bubble-free state which comprises continuously forwarding, at a substantially constant rate, a liquid containing bubbles, continuously forcing, at a substantially constant rate, into said bubble-containing liquid, as it is being forwarded and without increasing the volume thereof, a liquid of like composition but free from bubbles, the volume of said bubble-free liquid being at least equal to the volume of the bubbles in said bubble-containing liquid, whereby said bubbles are dissolved in the liquid and said bubble-free liquid is metered.

2. The process as defined in claim 1 in which the source of the bubble-free liquid which is forced into said bubble-containing liquid is the bubble-free liquid obtained by the said dissolution of bubbles from a preceding portion of bubble-containing liquid.

3. The process which comprises pumping a bubble-containing liquid from the inlet to the outlet of a pump, continuously forcing into said bubble-containing liquid, as it is being pumped and without increasing the volume thereof, a liquid of like composition but free from bubbles, the volume of said bubble-free liquid being at least equal to the volume of the bubbles in said bubble-containing liquid, whereby to dissolve said bubbles in said liquid and meter said bubble-free liquid.

4. The process which comprises pumping a bubble-containing liquid from the inlet to the outlet of a pump, passing a sufficient portion of said liquid from the outlet of said pump to the bubble-containing liquid passing between the inlet and outlet of said pump without increasing the volume of the liquid passing from the inlet to the outlet of the pump to dissolve and displace the bubbles contained in said bubble-containing liquid.

5. The process which comprises pumping a bubble-containing liquid from the inlet to the outlet of a pump, pumping a sufficient portion of said liquid from the outlet of said pump to the bubble-containing liquid passing between the inlet and outlet of said pump without increasing the volume of the liquid passing from the inlet to the outlet of the pump to dissolve and displace the bubbles contained in said bubble-containing liquid.

6. The process of dissolving the bubbles in a bubble-containing liquid and metering said liquid in its bubble-free state which comprises imparting a sufficient pressure to a bubble-containing liquid to partially dissolve the bubbles contained therein, continuously forwarding, at a substantially constant rate, said liquid containing partially dissolved bubbles, continuously forcing, at a substantially constant rate, into said bubble-containing liquid in which the bubbles have been partially dissolved, as it is being forwarded and without increasing the volume thereof, a liquid of like composition but free from bubbles, the volume of said bubble-free liquid being at least equal to the volume of the bubbles remaining in said bubble-containing liquid, whereby the remaining bubbles are dissolved in the liquid and said bubble-free liquid is metered.

7. The process as defined in claim 6 in which the source of the bubble-free liquid which is forced into said bubble-containing liquid is the bubble-free liquid obtained by said final dissolution of bubbles from a preceding portion of bubble-containing liquid.

WINFIELD WALTER HECKERT.

REFERENCES CITED

The following references are of record in the file of this patent:

UNITED STATES PATENTS

| Number | Name | Date |
| --- | --- | --- |
| 2,230,255 | Loumiet | Feb. 4, 1941 |
| 1,272,212 | Callar | July 9, 1918 |
| 1,863,160 | Jensen | June 14, 1932 |
| 1,799,237 | Jensen | Apr. 7, 1931 |
| 1,357,946 | Borzykowski | Nov. 9, 1920 |
| 1,357,947 | Borzykowski | Nov. 9, 1920 |
| 2,168,187 | Auger | Aug. 1, 1939 |
| 2,212,598 | Hagest | Aug. 27, 1940 |
| 1,837,446 | Kauffman | Dec. 22, 1931 |
| 2,212,994 | Vrolex | Aug. 27, 1940 |
| 2,281,767 | Heckert | May 5, 1942 |